Patented Sept. 17, 1940

2,215,150

UNITED STATES PATENT OFFICE 2,215,150

PROCESS FOR TREATING MINERAL FIBROUS SUBSTANCES, SUCH AS GLASS WOOL, SLAG WOOL, OR THE LIKE

Clemens Hannen, Sinzig-on-the-Rhine, Germany

No Drawing. Application December 16, 1937, Serial No. 180,261. In Germany December 28, 1936

3 Claims. (Cl. 49—77.5)

The invention relates to a process for treating mineral fibres obtainable from fused raw materials, such as glass wool, slag wool or the like, for the sake of brevity hereinafter called "glass wool," in order that they may be rendered suitable for the production of spun goods and textile fabrics.

The glass wool obtained by known processes by being blown from nozzles, by centrifuging, drawing and like expedients, is not, owing to the fact that it is generally brittle, unduly thick and smooth, suitable for the production of particular fabrics which should have a flannel-like quality. An object of the present invention is to produce a glass wool which has the desirable rough "feel."

In order that the necessary desired roughness of the glass wool fibers may be attained, there is added, during the conversion of the fused mass into fibers such as is practised in the said processes, finely ground powder which is then deposited on the surface of the still fluid and tacky glass wool fibers and gives them a rough "feel." For the production of this dust materials of widely varying type may be used, such as, glass, sand, quartz-sand, asbestos, quick-lime, limestone, fluorspar, chalk, pumice stone, and other corresponding kinds of stones with or without the addition of soda, potash, salts, and similar agents which bring about a rapid and firm union of the dust with the surface of the glass wool fibers. If necessary, the dust may be heated before use.

An object of a further feature of the invention is to produce a glass wool which is thinner, finer and, therefore, more flexible than was hitherto obtainable, and in order to attain this object the glass wool may be treated with liquid or gaseous solvents, such as hydrofluoric acid, ammonium fluoride, alkalies, acids and salts thereof, or with mixtures thereof, which are selected according to the kind of dust used. The solvents may be caused to act on the dust and on the raw material as desired.

Thus the main object of the invention is to roughen the surfaces of the fibers by mechanical means such as with the dust, by mechanical and chemical means such as with the dust and a solvent or solvents, and solely by chemical means such as with the solvent or solvents.

In the case of glass wool, the treatment with the solvents occurs with the material in the form of skeins, by the skeins being drawn through the solvent bath by means of a drum or a similar device or in the simplest form of treatment merely by hand. In the case of flocculent or short-fibre glass wool, the treatment may be by dipping, moistening or sprinkling.

Having now particularly described and ascertained the nature of my said invention and in what manner the same is to be performed, I declare that what I claim is:

1. A process for the treatment of silicious fibers which comprises forming fibers from molten material and while the fibers are still plastic, coating the surface thereof with a dust composed of a finely pulverized material selected from the following group consisting of, glass, sand, quartz sand, asbestos, quick lime, lime stone, fluorspar, chalk and pumice stone, to render them more suitable for spinning and weaving.

2. A process for the treatment of silicious fibers which comprises forming the fibers from molten material and while the fibers are still plastic, coating the surface thereof with a dust selected from the following group, consisting of glass, sand, quartz sand, asbestos, quick lime, lime stone, fluorspar, chalk and pumice stone, said dust having mixed with it a substance selected from the following group consisting of soda and potash, to render them more suitable for spinning and weaving.

3. A process for the treatment of silicious fibers to render their surfaces rough, which comprises coating said surfaces with a material selected from the following group consisting of glass, sand, quartz sand, asbestos, quick lime, lime stone, fluorspar, chalk and pumice stone, and treating the coated substance with a solvent that will attack its surface and is selected from the following group consisting of alkalies, ammonium fluoride and hydro-fluoric acid.

CLEMENS HANNEN.